(12) United States Patent
James et al.

(10) Patent No.: US 7,962,921 B2
(45) Date of Patent: Jun. 14, 2011

(54) APPARATUS AND METHODS USING INTELLIGENT WAKE MECHANISMS

(75) Inventors: Tsai James, Beaverton, OR (US); Marc Jalfon, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 1016 days.

(21) Appl. No.: 11/765,997

(22) Filed: Jun. 20, 2007

(65) Prior Publication Data

US 2008/0320492 A1  Dec. 25, 2008

(51) Int. Cl.
*G06F 13/00* (2006.01)

(52) U.S. Cl. ........ 719/318; 719/314; 719/321; 710/260; 710/263

(58) Field of Classification Search ................... 719/318, 719/314, 321; 710/260, 263
See application file for complete search history.

(56) References Cited

U.S. PATENT DOCUMENTS

| | | | |
|---|---|---|---|
| 6,122,748 A * | 9/2000 | Hobson .......................... | 713/323 |
| 6,732,190 B1 * | 5/2004 | Williams et al. ............... | 709/250 |
| 6,910,211 B1 * | 6/2005 | Wilhelm, Jr. .................. | 718/104 |
| 7,313,708 B2 * | 12/2007 | Oshins et al. .................. | 713/300 |
| 7,769,923 B2 * | 8/2010 | Pope et al. ...................... | 710/52 |
| 2003/0206564 A1 * | 11/2003 | Mills et al. ..................... | 370/528 |
| 2007/0183418 A1 * | 8/2007 | Riddoch et al. ................ | 370/389 |
| 2008/0098410 A1 * | 4/2008 | Oshins et al. .................. | 719/321 |
| 2008/0304519 A1 * | 12/2008 | Koenen et al. ................. | 370/477 |
| 2010/0192163 A1 * | 7/2010 | Pope et al. ..................... | 719/318 |

* cited by examiner

*Primary Examiner* — Andy Ho
(74) *Attorney, Agent, or Firm* — James S. Finn

(57) ABSTRACT

An embodiment of the present invention provides a network interface card (NIC), comprising an intelligent wake mechanism and a device driver associated with the intelligent wake mechanism and configured to agree with embedded software on a set of wake codes and wake behaviors associated with the wake codes such that when the NIC encounters a wake event, the NIC first adds the wake code to a command queue, then it drives a PME pin to high to wake a device connected to the NIC.

12 Claims, 2 Drawing Sheets

APPARATUS AND METHODS USING INTELLIGENT WAKE MECHANISMS

BACKGROUND

Currently, a network interface card (NIC), either wired or wireless, uses the PME signal to bring a system from an idle or sleep mode (also referred to herein as S3, S4 or S5 states) back to the active state (also referred to herein as the S0 state). This mechanism is often referred to as Wake-on-LAN or Wake-on-Wireless-LAN. An example using this mechanism is a NIC that wakes the system up when the incoming packet matches a fixed pattern. While this mechanism allows the system to stay in the low power state (S3/S4) and only wakes up when there is a meaningful thing to do, it is also very limited, in terms of types or degrees of wakes.

Thus, a strong need exists for apparatus and methods using intelligent wake mechanisms.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
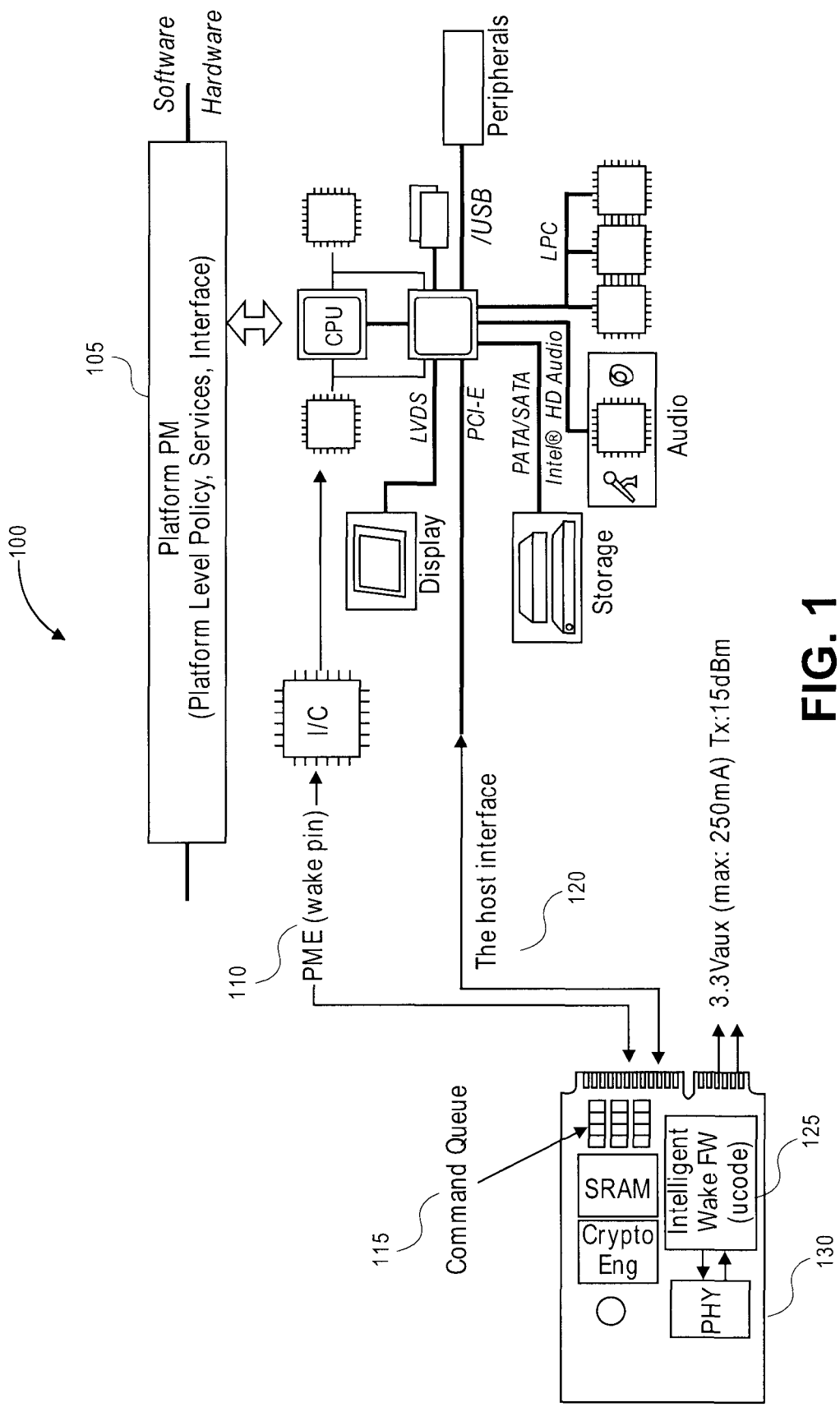
FIG. 1 illustrates a Wake-on-device architecture according to an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth (RTM), ZigBee (TM), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

An embodiment of the present invention provides an intelligent wake apparatus and method. In this embodiment of the present invention, the device driver and the embedded software (FW or microcode) agree on a set of wake codes and wake behaviors associated with the wake codes. When the device encounters a wake event, the device first adds the wake code to the command queue, then it drives the PME pin to high to wake the system from S3/S4 to S0. When the system wakes up from S3/S4, the device driver first restores its context, then it will receive an interrupt from the device regarding the wake code.

In an embodiment of the present invention and not limited in this respect, the device driver manages the wake behavior of the system accordingly. The possible wake behaviors may be (but are not limited to) full wake up, temporary wake up in order to execute a short piece of code and return to sleep, wakeup until a certain task completes (e.g. email sync, phone call), a partial wakeup during which only select parts of the system are powered/executing, etc. For instance, when a system in standby is roaming between access points (APs) in a wireless local area network (WLAN), the wireless NIC is in a low-power monitoring state and monitors any incoming packets, as well as maintains its connectivity such as re-authentication when roaming into a different extended service sets (ESS). In this case, in an embodiment of the present invention, the wireless NIC may issue a (re)authentication wake code to the host system, the host system wakes up, only wakes up a partial system (no hard drive, audio subsystem, LCD, and etc), starts the re-authentication procedure and then returns to standby state (S3/S4).

Turning now to the figures, FIG. 1, shown generally as 100, provides an illustration of a Wake-on-device architecture according to an embodiment of the present invention and may include platform PM 105, which may control platform level polices, services and interface. Further, the architecture may comprise command queue 115 in communication with PME (wake PIN) 110 and host interface 125; and further comprise intelligent wake code 130 connected to the physical layer 120.

Figure 2:
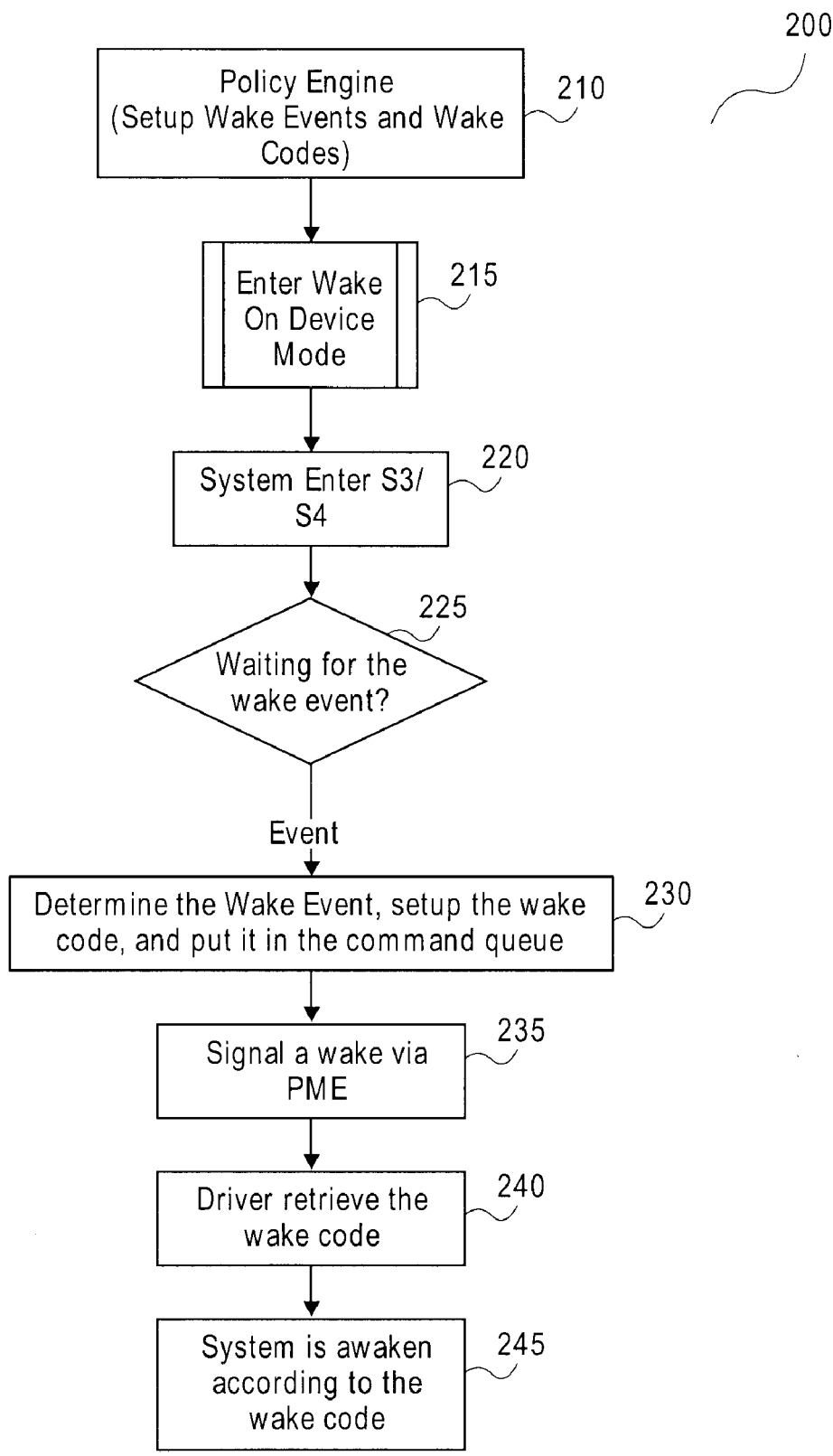
FIG. 2 provides a flowchart illustrating a method according to an embodiment of the invention.

FIG. 2 at 200 provides a flowchart illustrating the method according to an embodiment of the invention. At 210 the policy sets up wake-up events and wake-up codes and then at 220 enter wake on device mode and enters the S3/S4 mode at 225. At 230, an embodiment of the present invention waits for a wake event and at 235 once a wake event occurs, determine the wake event, set up the wake code and put in the command queue. At 235 signal the wake via PME, followed by driver retrieving the wake code at 240 and finally at 245 the system is awake according to the wake code.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a wireless communication device operable in a wake/sleep mode and including an intelligent wake mechanism including a device driver configured to agree with embedded software on a set of wake codes and wake behaviors associated with the wake codes, wherein when said apparatus encounters a wake event, said apparatus first adds said wake code to a command queue, then it drives a PME pin to high to wake said apparatus and wherein when said apparatus wakes up, said apparatus first restores its context, then it will receive an interrupt regarding the wake code and said device driver manages the wake behavior of the system accordingly.

2. The apparatus of claim 1, wherein said wake behaviors include full wake up and/or temporary wake up in order to execute a short piece of code and return to sleep and/or wakeup until a certain task completes and/or a partial wakeup during which only select parts of the system are powered/executing.

3. The apparatus of claim 2, wherein said apparatus is a wireless device operable in a wireless local area network (WLAN) and wherein when said wireless device is in standby and roaming between access points (APs) in said WLAN, a wireless network interface card (NIC) associated with said wireless device is in low-power monitoring state and monitors any incoming packets and maintains connectivity when roaming into a different ESS.

4. A method, comprising operating a device in a wake/sleep mode by using an intelligent wake mechanism including a device driver configured to agree with embedded software on a set of wake codes and wake behaviors associated with the wake codes, wherein when said device encounters a wake event, said device first adds said wake code to a command queue, then it drives a PME pin to high to wake said device and wherein when said device wakes up, said device first restores its context, then it will receive an interrupt regarding the wake code and said device driver manages the wake behavior of the system accordingly.

5. The method of claim 4, further comprising including in said wake behaviors full wake up and/or temporary wake up in order to execute a short piece of code and return to sleep and/or wakeup until a certain task completes and/or a partial wakeup during which only select parts of the system are powered/executing.

6. The method of claim 5, wherein said device is a wireless device operable in a wireless local area network (WLAN) and wherein when said wireless device is in standby and roaming between access points (APs) in said WLAN, a wireless network interface card (NIC) associated with said wireless device is in low-power monitoring state and monitors any incoming packets and maintains connectivity when roaming into a different ESS.

7. A non-transitory machine-accessible medium that provides instructions, which when accessed, cause a machine to perform operations comprising:
operating a device in a wake/sleep mode by using an intelligent wake mechanism including a device driver configured to agree with embedded software on a set of wake codes and wake behaviors associated with the wake codes, wherein when said device encounters a wake event, said device first adds said wake code to a command queue, then it drives a PME pin to high to wake said device and wherein when said device wakes up, said device first restores its context, then it will receive an interrupt regarding the wake code and said device driver manages the wake behavior of the system accordingly.

8. The machine-accessible medium of claim 7, further comprising said instructions causing said machine to perform operations further comprising including in said wake behaviors full wake up and/or temporary wake up in order to execute a short piece of code and return to sleep and/or wakeup until a certain task completes and/or a partial wakeup during which only select parts of the system are powered/executing.

9. The machine-accessible medium of claim 7, wherein said device is a wireless device operable in a wireless local area network (WLAN) and wherein when said wireless device is in standby and roaming between access points (APs) in said WLAN, a wireless network interface card (NIC) associated with said wireless device is in low-power monitoring state and monitors any incoming packets and maintains connectivity when roaming into a different ESS.

10. A network interface card (NIC), comprising:
an intelligent wake mechanism; and
a device driver associated with said intelligent wake mechanism and configured to agree with embedded software on a set of wake codes and wake behaviors associated with the wake codes such that when said NIC encounters a wake event, said NIC first adds said wake code to a command queue, then it drives a PME pin to high to wake a device connected to said NIC, and wherein when said apparatus wakes up, said apparatus first restores its context, then it will receive an interrupt regarding the wake code and said device driver manages the wake behavior of the system accordingly.

11. The NIC of claim 10, wherein said wake behaviors include full wake up and/or temporary wake up in order to execute a short piece of code and return to sleep and/or wakeup until a certain task completes and/or a partial wakeup during which only select parts of the system are powered/executing.

12. The NIC of claim 11, wherein said device is a wireless device operable in a wireless local area network (WLAN) and wherein when said wireless device is in standby and roaming between access points (APs) in said WLAN, a wireless network interface card (NIC) associated with said wireless device is in low-power monitoring state and monitors any incoming packets and maintains connectivity when roaming into a different ESS.

* * * * *